US010486686B2

(12) United States Patent
Meyer et al.

(10) Patent No.: US 10,486,686 B2
(45) Date of Patent: Nov. 26, 2019

(54) METHODS AND SYSTEM FOR ADJUSTING ENGINE TORQUE

(71) Applicant: Ford Global Technologies, LLC, Dearborn, MI (US)

(72) Inventors: Jason Meyer, Canton, MI (US); Walter Joseph Ortmann, Saline, MI (US); Jeffrey Allen Doering, Canton, MI (US); Kevin Ray Ruybal, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 15/626,750

(22) Filed: Jun. 19, 2017

(65) Prior Publication Data

US 2018/0362017 A1    Dec. 20, 2018

(51) Int. Cl.
*B60W 20/15*    (2016.01)
*F02D 37/02*    (2006.01)
(Continued)

(52) U.S. Cl.
CPC ............... *B60W 20/15* (2016.01); *B60K 6/26* (2013.01); *B60K 6/387* (2013.01); *B60K 6/485* (2013.01); *B60K 6/547* (2013.01); *B60W 10/06* (2013.01); *B60W 10/08* (2013.01); *B60W 10/10* (2013.01); *B60W 10/113* (2013.01); *B60W 10/18* (2013.01); *B60W 10/22* (2013.01); *B60W 30/184* (2013.01); *B60W 30/188* (2013.01);
(Continued)

(58) Field of Classification Search
CPC ...... B60W 20/15; B60W 10/22; B60W 10/18; B60W 10/10; B60W 10/06; B60W 30/188; B60W 30/184; B60W 10/08; B60W 2510/0657; B60W 2710/065; B60W 2710/1011; B60W 2510/1005; B60W 2710/18; B60W 2510/0208; B60W 2540/12; B60W 2510/0642; B60W 2510/1015; B60W 2710/021; B60W 2710/0666; B60W 2710/1005; B60W 2510/105; B60W 2530/20; B60W 2510/18; F02D 41/083; F02D 31/008; F02D 41/1497; F02D 2250/24; F02D 2250/18; F02P 5/1508; B60K 6/26; B60K 6/387; B60Y 2300/70; B60Y 2300/428
See application file for complete search history.

(56) References Cited

U.S. PATENT DOCUMENTS 5,090,382 A   2/1992  Bolander et al.
5,951,614 A *  9/1999  Tabata .................... B60K 6/48
                                                    701/54

(Continued)

FOREIGN PATENT DOCUMENTS

WO    2013039726 A1    3/2013

*Primary Examiner* — Thomas Ingram
(74) *Attorney, Agent, or Firm* — David Kelley; McCoy Russell LLP

(57) ABSTRACT

Methods and systems are provided for operating a driveline of a hybrid vehicle that includes an internal combustion engine, an electric machine, and a transmission are described. In one example, values of an engine spark to engine torque relationship are adjusted to improve engine torque control. The engine is subsequently operated responsive to adjusted values of the engine spark to engine torque relationship.

19 Claims, 7 Drawing Sheets

(51) Int. Cl.

| | | |
|---|---|---|
| F02D 41/08 | (2006.01) | |
| F02D 41/26 | (2006.01) | |
| B60W 30/184 | (2012.01) | |
| B60W 30/188 | (2012.01) | |
| B60W 10/06 | (2006.01) | |
| B60W 10/08 | (2006.01) | |
| B60W 10/10 | (2012.01) | |
| B60W 10/18 | (2012.01) | |
| B60W 10/22 | (2006.01) | |
| B60K 6/387 | (2007.10) | |
| B60K 6/26 | (2007.10) | |
| F02D 41/14 | (2006.01) | |
| F02P 5/15 | (2006.01) | |
| F02D 31/00 | (2006.01) | |
| B60K 6/485 | (2007.10) | |
| B60K 6/547 | (2007.10) | |
| B60W 10/113 | (2012.01) | |
| B60W 30/18 | (2012.01) | |
| B60W 50/00 | (2006.01) | |

(52) U.S. Cl.
CPC ..... *B60W 30/18054* (2013.01); *F02D 31/008* (2013.01); *F02D 37/02* (2013.01); *F02D 41/08* (2013.01); *F02D 41/083* (2013.01); *F02D 41/1497* (2013.01); *F02D 41/26* (2013.01); *F02P 5/1508* (2013.01); *B60K 2006/268* (2013.01); *B60W 2050/0083* (2013.01); *B60W 2510/0208* (2013.01); *B60W 2510/0642* (2013.01); *B60W 2510/0657* (2013.01); *B60W 2510/1005* (2013.01); *B60W 2510/105* (2013.01); *B60W 2510/1015* (2013.01); *B60W 2510/18* (2013.01); *B60W 2530/20* (2013.01); *B60W 2540/12* (2013.01); *B60W 2710/021* (2013.01); *B60W 2710/065* (2013.01); *B60W 2710/0644* (2013.01); *B60W 2710/0666* (2013.01); *B60W 2710/083* (2013.01); *B60W 2710/1005* (2013.01); *B60W 2710/1011* (2013.01); *B60W 2710/18* (2013.01); *B60Y 2300/428* (2013.01); *B60Y 2300/70* (2013.01); *B60Y 2400/428* (2013.01); *F02D 2250/18* (2013.01); *F02D 2250/24* (2013.01); *Y10S 903/93* (2013.01)

(56) References Cited

U.S. PATENT DOCUMENTS

| | | | |
|---|---|---|---|
| 6,319,170 | B1 | 11/2001 | Hubbard et al. |
| 6,845,305 | B1 | 1/2005 | Raftari et al. |
| 7,268,442 | B2 | 9/2007 | Syed et al. |
| 7,797,096 | B2 | 9/2010 | Reynolds et al. |
| 9,358,974 | B2 | 6/2016 | Doering et al. |
| 2003/0191571 | A1* | 10/2003 | Aldrich, III ............ F02D 41/16 701/54 |
| 2015/0114345 | A1* | 4/2015 | Lockwood .............. F02D 29/02 123/344 |
| 2018/0208047 | A1* | 7/2018 | Ishida ...................... B60K 6/48 |

* cited by examiner

METHODS AND SYSTEM FOR ADJUSTING ENGINE TORQUE

FIELD

The present description relates generally to methods and systems for controlling torque of an internal combustion engine. The methods and systems may be particularly suited for hybrid vehicles that include a dual clutch transmission.

BACKGROUND/SUMMARY

Torque of an internal combustion engine may be adjusted via adjusting engine air flow, an amount of fuel delivered to the engine, and adjusting engine spark timing. Engine spark timing may be empirically determined and stored in tables or functions in memory of a controller. Spark timing may be adjusted as engine speed and load change to provide a higher level of engine efficiency and avoid engine knock. In addition, spark timing may be reduced from time to time to reduce engine torque since engine torque may be reduced more quickly via spark timing than via adjusting engine air flow. For example, engine spark timing may be retarded from minimum spark timing for best engine torque (MBT) timing during a gear shift of a dual clutch transmission so that engine speed may be synchronized with transmission input shaft speed during an upshift. If spark timing adjustments are not well correlated to a desired engine torque reduction or increase, engine speed during the shift will not match transmission input shaft speed. If engine speed does not match transmission input shaft speed, clutch slip and degradation may increase. In addition, transmission shift feel may degrade.

The inventors herein have recognized the above-mentioned issues and have developed a driveline operating method, comprising: maintaining an engine at idle speed and operating the engine in a torque control mode while input clutches of a transmission are open in response to a request to adapt values of an engine spark to engine torque relationship, the engine positioned upstream of the input clutches; adjusting the values responsive to engine torque while maintaining the engine at idle speed; and operating the engine responsive to the values.

By maintaining an engine at idle speed and operating the engine in a torque control mode while input clutches of a transmission are open in response to a request to adapt values of an engine spark to torque relationship, and adjusting the values responsive to engine torque while maintaining the engine idle speed, it may be possible to adapt engine spark timing so that an engine provides a desired amount of torque. In one example, engine speed is maintained at engine idle speed via an integrated starter/generator while the engine operates in a torque control mode. The engine output torque may be determined via ISG current so that engine spark timing values that provides a desired amount of engine torque may be adjusted. The engine spark to engine torque relationship values may be adjusted responsive to engine torque and engine spark timing values during a period when the engine is not propelling a vehicle so that adaptation may not be noticeable to vehicle occupants. The adaptation of engine spark to engine torque values may be based on steady-state and dynamic vehicle operating conditions.

The present description may provide several advantages. Specifically, the approach may improve efficiency vehicle drivability. Further, the approach may improve vehicle drivability without having to disturb vehicle occupants. Further still, the approach may reduce driveline torque disturbances and driveline component degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
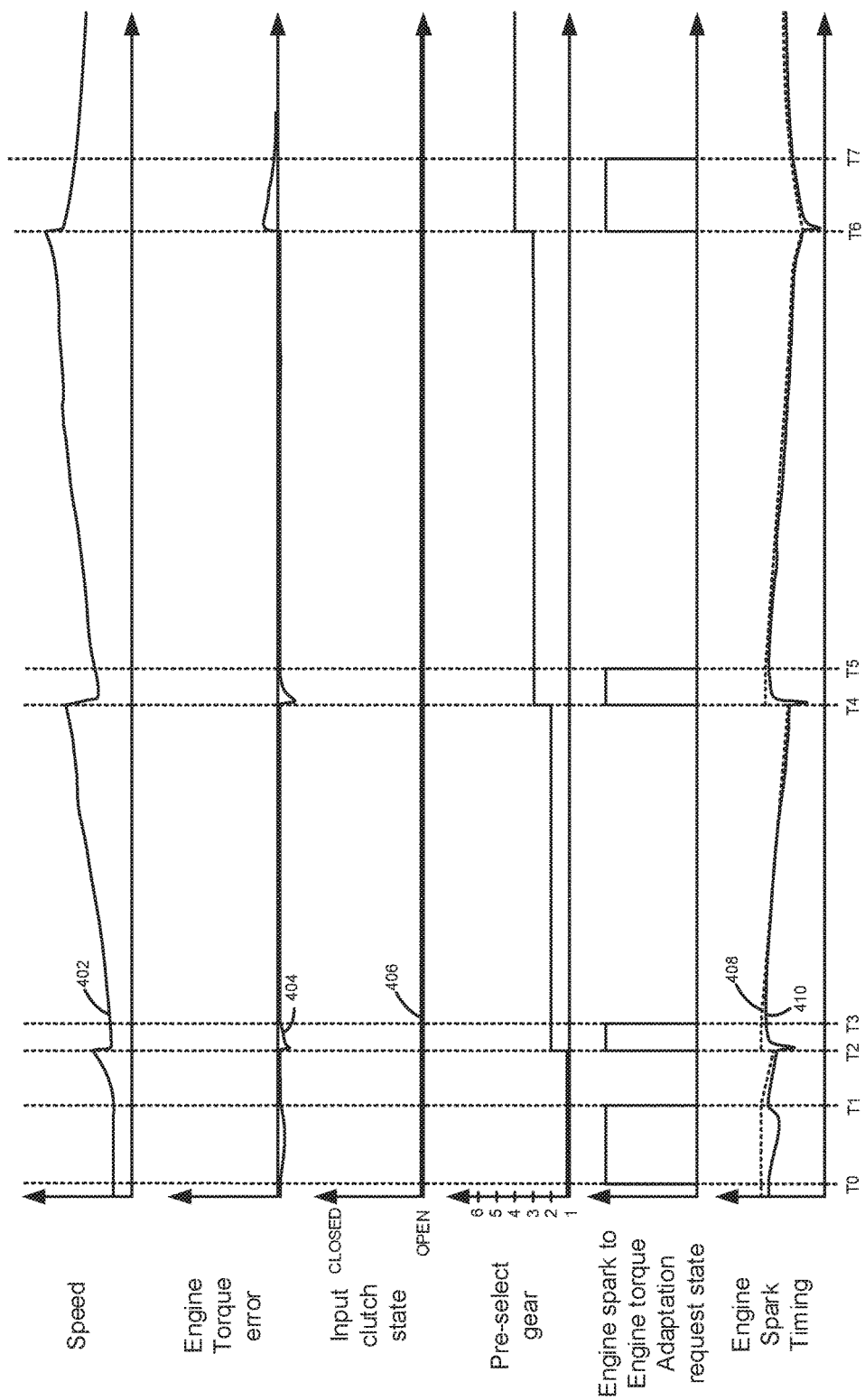
FIG. 4 is a prophetic driveline operating sequence.
Figure 5:
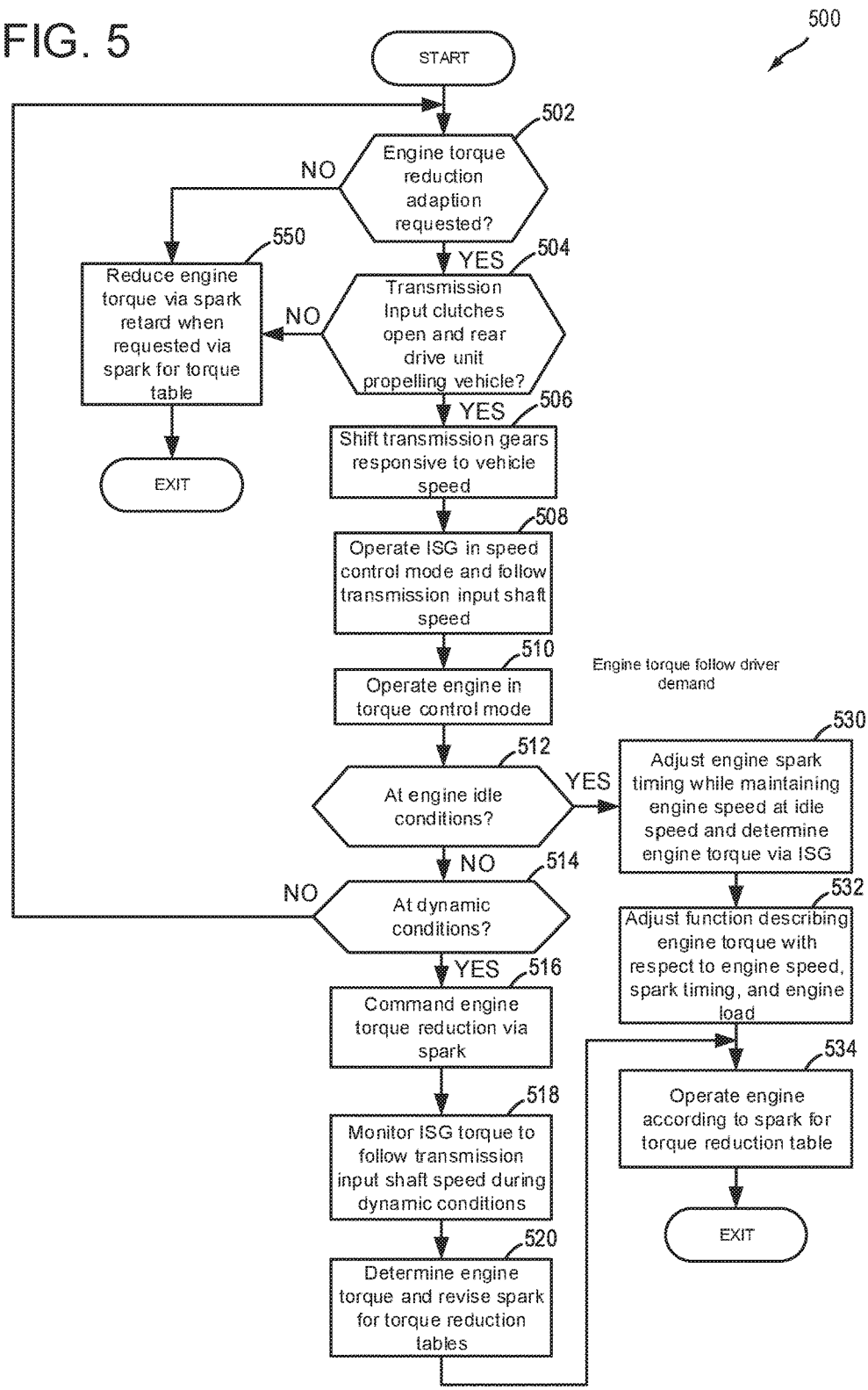
FIG. 5 is a flowchart of a method to operate a hybrid vehicle driveline.
Figure 6:
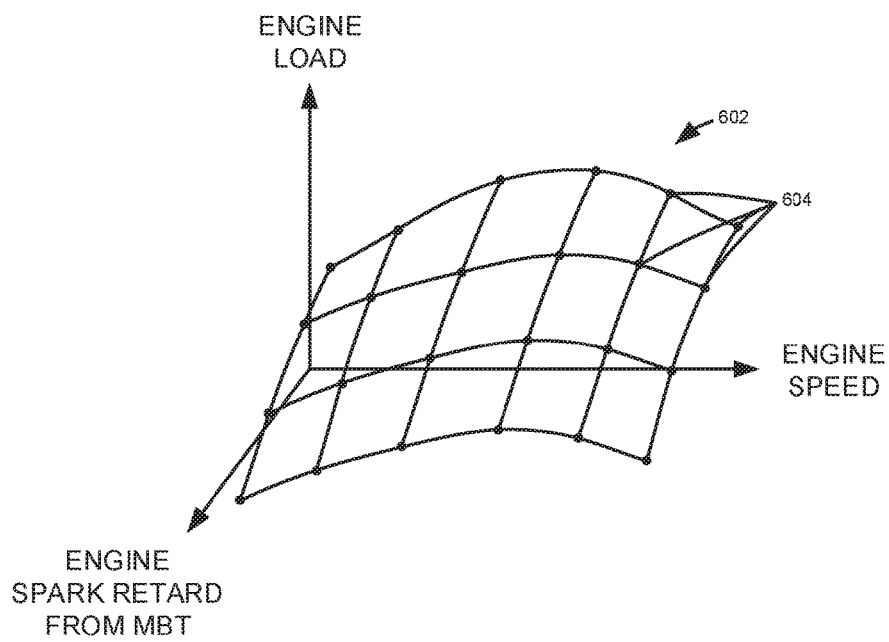
FIG. 6 is a plot of an example engine spark to engine torque relationship that may be adapted or adjusted to improve engine torque control.

The following description relates to systems and methods for operating a driveline of a hybrid vehicle. FIGS. 1A-3 show an example hybrid vehicle system that includes a driveline with a motor, an integrated starter/generator, a dual clutch transmission, and a rear drive unit with an electric machine that is positioned downstream of the dual clutch transmission. FIG. 4 shows a prophetic driveline operating sequence for improving vehicle kinetic energy utilization. FIG. 5 is a flowchart of an example of operating a hybrid vehicle driveline. FIG. 6 is an example plot showing a relationship between engine spark timing and engine torque output.

Figure 1A:
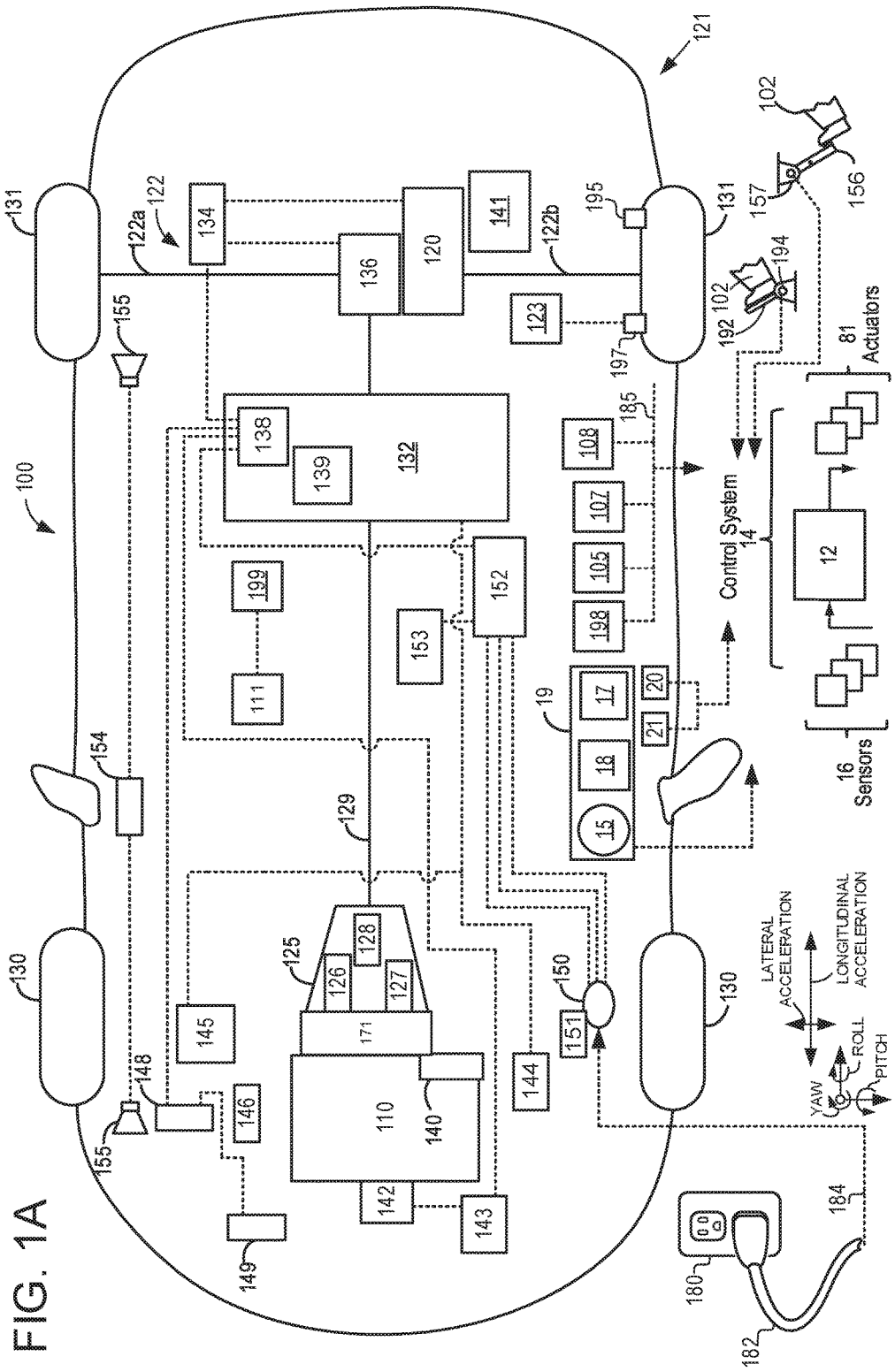
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131. Rear drive unit 136 may include a gear set and one or more clutches to decouple transmission 125 and electric machine 120 from wheels 131. Rear drive unit 136 may include electric machine 120 and axle 122.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131. As will be discussed in further detail below with regard to FIG. 2, transmission 125 may shift gears by selectively opening and closing first clutch 126 and second clutch 127.

Electric machine 120 may receive electrical power from onboard energy storage device 132. Furthermore, electric machine 120 may provide a generator function to convert engine output or the vehicle's kinetic energy into electrical energy, where the electrical energy may be stored at energy storage device 132 for later use by the electric machine 120, integrated starter/generator 142, or optional integrated starter/generator 171. A first inverter system controller (ISC1) 134 may convert alternating current generated by electric machine 120 to direct current for storage at the energy storage device 132 and vice versa.

In some examples, energy storage device 132 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 14 may communicate with one or more of engine 110, electric machine 120, energy storage device 132, integrated starter/generator 142, optional integrated starter/generator 171, transmission 125, etc. Control system 14 may receive sensory feedback information from one or more of engine 110, electric machine 120, energy storage device 132, integrated starter/generator 142, optional integrated starter/generator 171, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle: height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131 and configured to monitor a pressure in a tire of wheel 131. While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system or anti-skid braking system, such that wheels (e.g. 130, 131) may maintain tractive contact with the road surface according to driver inputs while braking, which may thus prevent the wheels from locking up, to prevent skidding. In some examples, BSCM may receive input from wheel speed sensors 195.

Vehicle propulsion system 100 may further include a belt integrated starter/generator (BISG) 142 or an optional integrated starter/generator. BISG and/or optional integrated starter/generator may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142 or optional integrated starter/generator 171, and may convert alternating current generated by BISG 142 or optional integrated starter/generator 171 to direct current for storage at energy storage device 132. Integrated starter/generator 142 or optional integrated starter/generator 171 may also provide torque to engine 110 during engine starting or other conditions to supplement engine torque. Optional integrated starter/generator 171 may be directly coupled to engine 110 via engine crankshaft 40B.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle.

In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 130) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 1B:
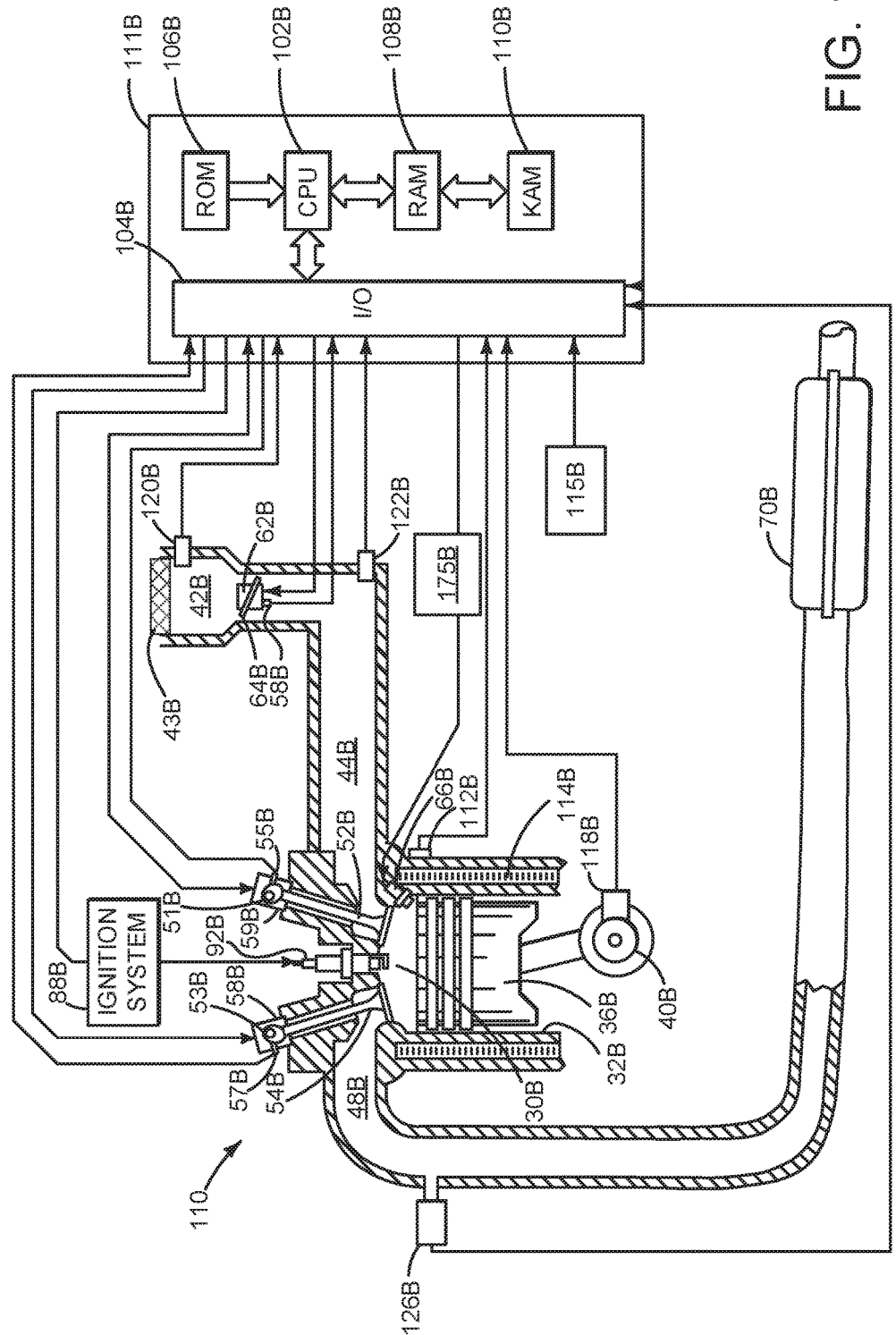
FIG. 1B is a sketch of an engine of the hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 2:
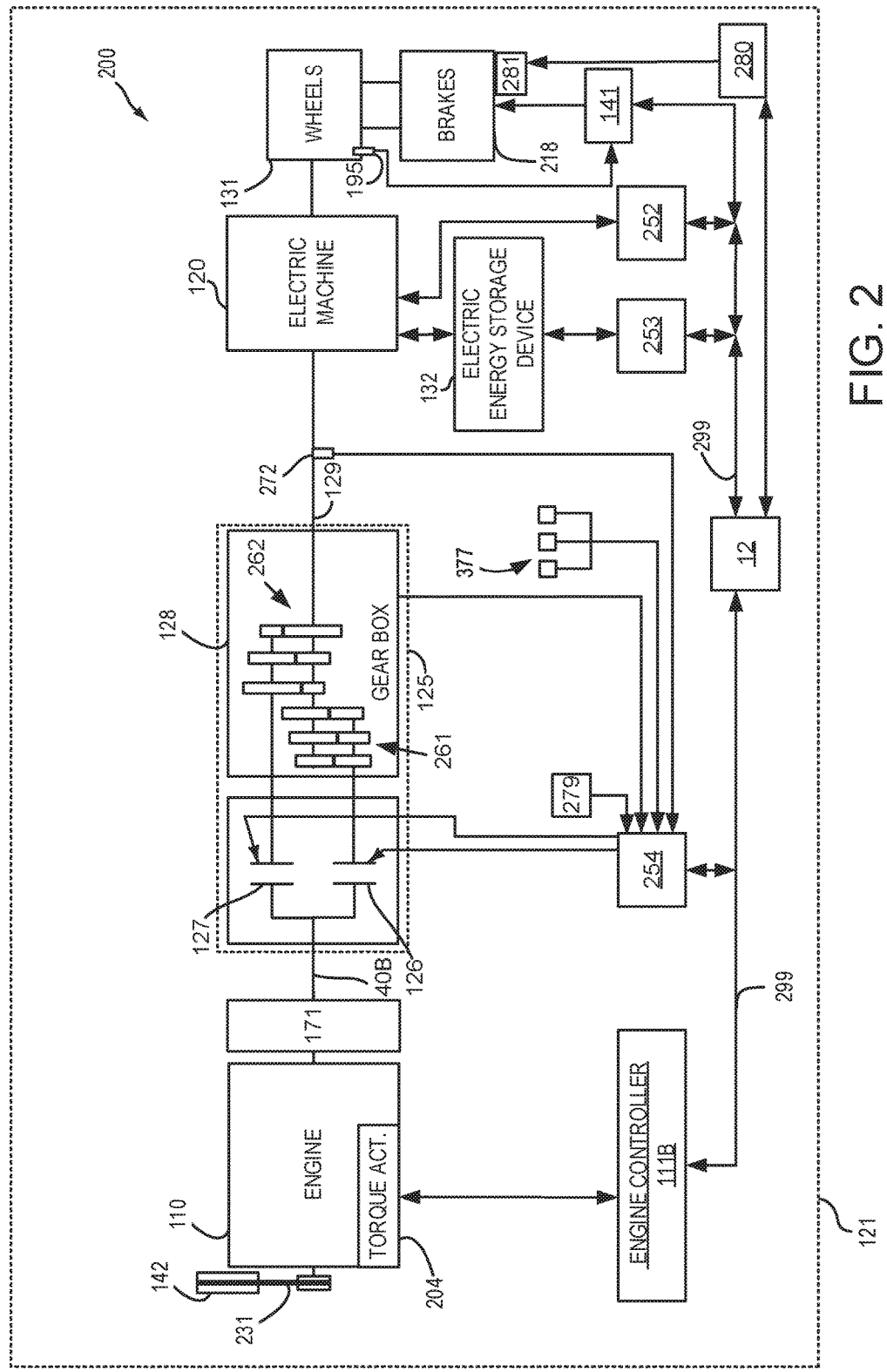
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIGS. 1A-1B. Other components of FIG. 2 that are common with FIG. 1A are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), toque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the desired braking torque at vehicle wheels 131.

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110, and/or electric machine 120, and optional integrated starter/generator 171. In other examples, engine 110 may be omitted. Engine 110 may be started with an engine starter (e.g. 140), via belt integrated starter/generator (BISG) 142, or optional integrated starter/generator 171, or via electric machine 120. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131. Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131 in a direction starting at engine 110 and ending at wheels 131. Thus, according to the direction of positive torque flow in driveline 200, engine 110 is positioned in driveline 200 upstream if transmission 125. Transmission 125 is positioned upstream of electric machine 120, and BISG 142 may be positioned upstream of engine 110, or downstream of engine 110 and upstream of transmission 125.

Figure 3:
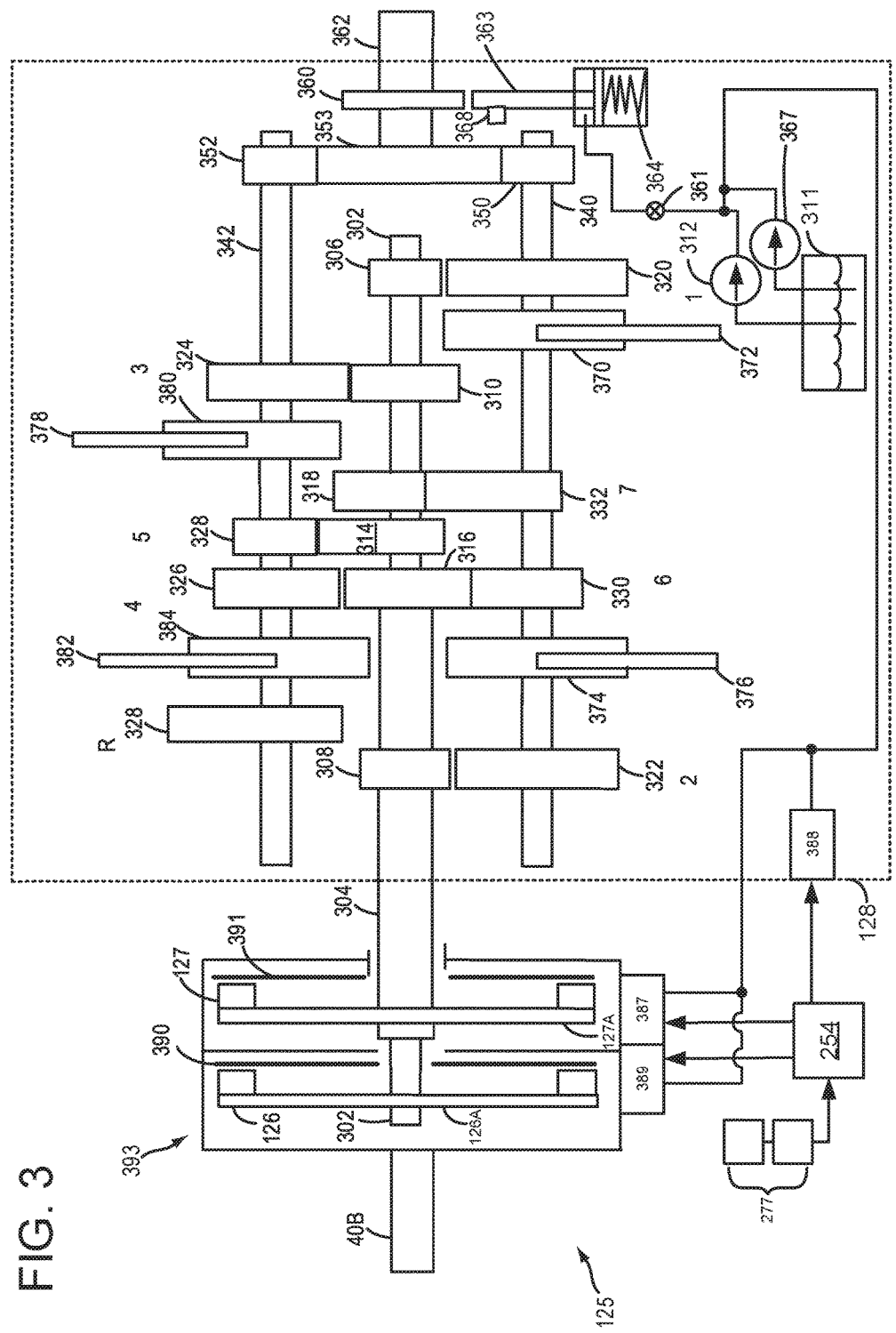
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 493 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 328, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 328, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131 of FIG. 1A) to rotate at different speeds, for example when performing turning maneuvers.

As discussed above, each of first gear 320, second gear 322, third gear 324, fourth gear 326, fifth gear 328, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 340 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 328. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor, which may be utilized by the TCM to detect position of selector forks (e.g. 372, 376, 378, 382).

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130, 131) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, the system of FIGS. 1A-3 provides for a system, comprising: an engine; an integrated starter/generator coupled to the engine; a transmission including a first input clutch, a second input clutch, a first input shaft and a second input shaft, a first layshaft selectively coupled to the first input shaft, a second layshaft selectively coupled to the second input shaft, a plurality of gears, and an output shaft coupled to the first and second layshafts; a rear drive unit including a rear axle and an electric machine coupled to the dual clutch transmission via a driveshaft; and a controller including executable instructions stored in non-transitory memory to propel a vehicle via the rear drive unit while adjusting values of an engine spark to engine torque relationship, and instructions to operate then engine according to the adjusted values of the engine spark to engine torque relationship.

In some examples, the system further comprises additional instructions to pre-select gears of the transmission while propelling the vehicle via the rear drive unit. The system further comprises additional instructions to follow a speed of the first input shaft or the second input shaft via the ISG. The system includes where pre-selecting gears of the transmission includes locking gears of the transmission to the first layshaft or the second layshaft. The system further comprises propelling the vehicle via the rear drive unit with the first and second input clutches being open. The system further comprises additional instructions to adjust values of the engine spark to engine torque relationship responsive to engine torque values provided when the first and second input clutches are open.

Turning to FIG. 4, a prophetic hybrid vehicle driveline operating sequence is shown. The operating sequence of FIG. 4 may be provided via the system of FIGS. 1A-3 in cooperation with the method of FIG. 5. The plots shown in FIG. 4 occur at the same time and are aligned in time. Vertical lines T0-T7 represent times of interest during the driveline operating sequence.

The first plot from the top of FIG. 4 is a plot of speed versus time. The vertical axis represents speed and speed increases in the direction of the vertical axis arrow. The horizontal axis represents time and time increases from the left side of the figure to the right side of the figure. Solid line 404 represents a desired engine speed. The desired engine speed may be a speed that is equivalent to or that follows transmission input shaft speed. ISG speed and engine speed are equivalent since the ISG is coupled to the engine.

The second plot from the top of FIG. 4 is a plot of engine torque error versus time. The vertical axis represents engine torque error and engine torque errors above the horizontal line are positive and engine torque errors below the horizontal line are negative engine torque errors. Positive engine torque error increases in the direction of the vertical upward pointing arrow. The magnitude of negative engine torque error increases in the direction of the vertical downward pointing arrow. In one example, the desired engine torque is ISG torque plus the commanded engine torque. Therefore, the engine torque error is equal to ISG torque. The horizontal axis represents time and time increases from the left side of the figure to the right side of the figure.

The third plot from the top of FIG. 4 is a plot of transmission input clutch state versus time. The vertical axis represents transmission input clutch operating state for both transmission input clutches. A transmission input clutch may be closed so as to transfer torque when trace 406 is at a higher level near the closed label. The transmission clutches are open and not transferring torque when trace 406 is near the horizontal axis near the open label. The horizontal axis represents time and time increases from the left side of the figure to the right side of the figure.

The fourth plot from the top of FIG. 4 is a plot of pre-selected transmission gear (e.g., transmission gear that is locked to a lay shaft and spins at a speed dependent on vehicle wheel speed) versus time. The vertical axis represents pre-selected transmission gear and the gear numbers are located along the vertical axis. The horizontal axis represents time and time increases from the left side of the figure to the right side of the figure.

The fifth plot from the top of FIG. 4 is a plot of an engine spark state to engine torque relationship adaptation request state versus time. The vertical axis represents engine spark state to engine torque relationship adaptation request state and the engine spark state to engine torque relationship adaptation request state is asserted when the trace is at a higher level near the vertical axis arrow. Adaptation of the engine spark to engine torque relationship is requested when the engine spark to engine torque relationship adaptation request state is asserted. The engine spark state to engine torque relationship adaptation request state is not asserted when the trace is at a lower level near the horizontal axis. The horizontal axis represents time and time increases from the left side of the figure to the right side of the figure.

The sixth plot from the top of FIG. 4 is a plot of engine spark timing versus time. The vertical axis represents engine spark timing and the engine spark timing advances in the direction of the vertical axis arrow. The horizontal axis represents time and time increases from the left side of the figure to the right side of the figure. Dotted line 408 represents minimum spark timing for best engine torque (MBT). Solid line 410 represents engine spark timing at the particular time.

At time T0, the desired engine speed is an engine idle speed. The engine torque error is zero and the transmission input clutch is in an open state. The transmission's first gear is pre-selected and adaptation of the engine spark to engine torque relationship is not requested. The engine is operated in a torque control mode (not shown), and the desired engine torque (not shown) is a torque that rotates the engine at idle speed at zero driver demand torque. The ISG or BISG (not shown) is operating in a speed control mode where the ISG or BISG follows transmission input shaft speed (e.g., speed of the transmission shaft that is coupled to the transmission output shaft via a pre-selected gear). Engine spark timing is slightly retarded from MBT spark timing so that there is a torque reserve in case a load is applied to the engine.

At time T1, a request to adapt the engine spark to engine torque relationship is issued and desired engine speed remains at idle speed. The engine torque error is zero and the transmission input clutches are open. First gear is pre-selected and the ISG (not shown) is in speed control mode to maintain engine and ISG speed at engine idle speed. Engine spark timing is retarded from MBT spark timing.

Between time T0 and time T1, the request to adapt the engine spark to engine torque relationship is maintained and engine spark timing is continuously retarded to adjust engine torque. The desired engine torque is a torque that maintains the engine at idle speed (not shown), but the engine torque is commanded to a reduced torque and the ISG torque is increased to maintain engine and ISG speed at engine idle speed. The engine is commanded to the lower torque via retarding engine spark timing. The engine torque reduction amount may be determined from ISG current as engine spark timing is retarded. For example, if the ISG current is zero immediately before spark retard begins and it is 10 amperes after retarding spark timing, the change in engine torque is equivalent to ISG torque produced via 10 amperes. Engine spark timing and engine torque are determined continuously and stored to controller memory (e.g., RAM transient memory) as engine spark is retarded. The engine spark timing is retarded and then advanced toward MBT spark timing. The transmission remains pre-selected in first gear and the transmission clutch remains open so that engine and ISG torque is not transmitted to vehicle wheels. The engine speed error is zero.

At time T1, request to adapt the engine spark to engine torque relationship is rescinded and engine spark timing is at base spark timing for when the engine is idling. The engine torque error is zero and the transmission input clutch remains open. The transmission remains pre-selected in first gear. Thus, determining parameters for adapting the engine spark to torque relationship ends at time T1 and storing the parameters to controller memory also ceases. The values of the relationship between engine spark timing and engine torque may be adjusted responsive to engine spark and engine torque determined from time T0 to time T1. For example, if a value of engine torque for a given spark timing determined from time T0 to time T1 is a threshold greater or less than a value in the engine spark to engine torque relationship corresponding to the engine spark timing, then the engine torque value in the engine spark to engine torque relationship corresponding to the engine spark timing is revised with the engine torque value determined between time T0 and T1, or a portion or fraction thereof.

Between time T1 and time T2, the vehicle in which the engine resides is propelled via a rear drive unit electric machine. The rear drive unit electric machine provides torque to the vehicle wheels that is responsive to driver demand torque and vehicle speed. The driver demand torque may be a function of accelerator pedal position and vehicle speed. As the vehicle accelerates the transmission output shaft turns at a ratio the vehicle's wheel speed. The transmission output shaft rotates the layshaft that first gear is locked to and the layshaft rotates the input shaft that corresponds to first gear (e.g., 302 of FIG. 3). The engine torque (not shown) is adjusted responsive to the driver demand torque (not shown) and the ISG ensures that the engine rotates at the speed of the input shaft corresponding to first gear. The engine torque error is zero and the transmission is pre-selected in first gear. The request for adapting the engine spark to engine torque relationship is not asserted and engine spark timing is close to MBT spark timing.

At time T2, the pre-selected gear is changed in the transmission from first gear to second gear in response to driver demand torque and vehicle speed. In particular, first gear is unlocked from a layshaft and second gear is locked to a layshaft. The ISG is commanded to follow speed output from a model that describes the pre-select gear change, and the engine speed is the same as ISG speed since the ISG is coupled to the engine. In one example, the model outputs an input shaft speed that is a function of transmission output shaft speed and the ratio of the pre-selected gear. The time of the pre-selected gear shift is based on vehicle speed and driver demand torque. For example, the transmission may be shifted from pre-selected gear number one to pre-selected gear number two at a speed of 10 KPH and a driver demand torque of 75 N-m. The conditions that determine the time of shift may be stored in a shift schedule and the shift schedule includes different conditions for pre-selected shifting between each of the transmission gears. The model adjusts the transmission input shaft speed responsive to transmission output shaft speed and the engaged pre-selected gear (e.g., the pre-selected gear that is locked to a layshaft). For example, the transmission input shaft speed may be the transmission output shaft speed divided by the ratio of the pre-selected gear. Alternatively, the ISG speed may be commanded to follow the transmission input shaft speed that is coupled to the pre-selected transmission gear. For example, if a first transmission input shaft is coupled to a first pre-selected gear, the ISG speed is commanded to follow the first transmission input shaft speed. Then, when the transmission is shifted to a second pre-selected gear, the ISG is commanded to follow the speed of a second transmission input shaft, the second transmission input shaft coupled to the second pre-selected gear.

The engine torque (not shown) may also be commanded so that engine speed follows or leads (e.g., moves earlier in time) the transmission input shaft speed output from the model or the observed transmission output shaft speed. During an upshift, the transmission input shaft speed is reduced because a higher ratio gear is pre-selected. The engine speed may be reduced to the new transmission input shaft speed by reducing engine torque via spark retard. An estimate of engine torque to provide the lower engine speed during and after the pre-select gear is shifted may be modeled or empirically determined and stored to controller memory. In one example, an engine spark to engine torque relationship for a plurality of engine speeds and loads is stored to controller memory and engine spark timing is adjusted responsive to values in the engine spark to torque relationship. For example, if it is determined that an engine torque reduction of 40 N-m is needed to reduce engine speed to transmission input shaft speed, the engine spark to engine torque relationship may be referenced or indexed by a torque reduction of 40 N-m and the engine spark to engine torque relationship outputs a spark retard value (e.g., 5 crankshaft degrees) from the present engine spark value.

The engine spark to engine torque adaptation request is also asserted at time T2 and the transmission input clutch state remains open. The engine spark begins to be retarded so that engine speed will follow transmission input shaft speed. The engine torque error is nearly zero.

Between time T2 and time T3, the engine spark to engine torque adaptation request remains asserted and engine spark is retarded to reduce engine torque so that engine speed follows the transmission input shaft speed. The conditions between time T2 and time T3 are dynamic spark control conditions since the transmission is shifting and engine speed and ISG speed is attempting to follow transmission input shaft speed via engine torque reduction. An engine torque error determined from ISG current develops and the engine torque error is a difference between engine torque provided by the engine and engine torque commanded to follow the transmission input shaft speed. The engine torque error begins at a larger value and then is reduced. In this example, the actual engine torque is less than the desired engine torque so the engine torque error is negative. The engine torque and spark that produced the engine torque are stored to controller memory. If the engine torque produced during the pre-selected gear shift is not within a threshold torque of the commanded engine torque, the engine spark timing or estimated engine torque in the engine spark to engine torque reference may be adjusted. For example, if engine torque during the shift is commanded to be reduced by 50 N-m and the spark timing corresponding to the engine torque reduction is 5 degrees, but the actual engine torque is reduced by 75 N-m, then the spark timing in the engine spark timing to engine torque relationship may be revised to 3 degrees of spark retard to move the engine torque reduction toward the desired engine torque reduction.

At time T3, the request to adapt the engine spark to engine torque relationship is rescinded and engine spark timing is at base spark timing for the engine operating conditions. The engine torque error is zero and the transmission input clutch remains open. The transmission is engaged in pre-selected second gear. Thus, determining parameters for adapting the engine spark to torque relationship ends at time T3 and storing the parameters to controller memory also ceases. The values of the relationship between engine spark timing and engine torque may be adjusted responsive to engine spark and engine torque determined from time T2 to time T3. For example, if a value of engine torque for a given spark timing determined from time T2 to time T3 is a threshold greater or less than a value in the engine spark to engine torque relationship corresponding to the engine spark timing, then the engine torque value in the engine spark to engine torque relationship corresponding to the engine spark timing is revised with the engine torque value determined between time T2 and T3, or a portion or fraction thereof.

Between time T3 and time T4, the vehicle continues to accelerate under power from the rear drive unit electric machine in response to driver demand torque. The request to adapt the engine spark to engine torque relationship is not asserted and the engine torque error is near zero. The transmission remains in pre-selected second gear and engine spark timing is near MBT spark timing. The engine torque (not shown) is commanded to follow driver demand torque (not shown) and the ISG speed, along with engine speed, continues to follow the transmission input shaft speed.

At time T4, the pre-selected gear is changed in the transmission from second gear to third gear in response to driver demand torque and vehicle speed. The ISG is commanded to follow speed output from a model or transmission input shaft speed. Alternatively, the ISG speed may be commanded to follow the transmission input shaft speed that is coupled to the pre-selected transmission gear. The engine torque (not shown) may also be commanded so that engine speed follows or leads (e.g., moves earlier in time) the transmission input shaft speed output from the model or the observed transmission output shaft speed. During the upshift, the transmission input shaft speed is reduced because a higher ratio gear is pre-selected. The engine spark to engine torque adaptation request is also asserted at time T4 and the transmission input clutch state remains open. The engine spark begins to be retarded so that engine speed will follow transmission input shaft speed. The engine torque error is nearly zero.

Between time T4 and time T5, the engine spark to engine torque adaptation request remains asserted and engine spark is retarded to reduce engine torque so that engine speed follows the transmission input shaft speed. The conditions between time T4 and time T5 are dynamic spark control conditions since the transmission is shifting and engine speed and ISG speed is attempting to follow transmission input shaft speed via engine torque reduction. The ISG speed is adjusted to follow a transmission input shaft speed which may be output from the model. An engine torque error determined from ISG current develops and the engine torque error is a difference between engine torque provided by the engine and engine torque commanded to follow the transmission input shaft speed. The engine torque error is negative with a larger magnitude and then it is reduced. The actual engine torque is less than the desired engine torque so the engine torque error is negative. The engine torque and spark that produced the engine torque are stored to controller memory. If the engine torque produced during the pre-selected gear shift is not within a threshold torque of the commanded engine torque, the engine spark timing may be adjusted.

At time T5, the request to adapt the engine spark to engine torque relationship is once again rescinded and engine spark timing is at base spark timing for the engine operating conditions. The engine torque error is zero and the transmission input clutch remains open. The transmission is engaged in pre-selected third gear. In this way, determining parameters for adapting the engine spark to torque relationship ends at time T5 and storing the parameters to controller memory also ceases. The values of the relationship between engine spark timing and engine torque may be adjusted responsive to engine spark and engine torque determined from time T4 to time T5.

Between time T5 and time T6, the vehicle continues to accelerate under power from the rear drive unit electric machine in response to driver demand torque. The request to adapt the engine spark to engine torque relationship is not asserted and the engine torque error is near zero. The transmission remains in pre-selected third gear and engine spark timing is near MBT spark timing. The engine torque (not shown) is commanded to follow driver demand torque (not shown) and the ISG speed, along with engine speed, continues to follow the transmission input shaft speed.

At time T6, the pre-selected gear is changed in the transmission from third gear to fourth gear in response to driver demand torque and vehicle speed. The ISG is commanded to follow speed output from a model. Alternatively, the ISG speed may be commanded to follow the transmission input shaft speed that is coupled to the pre-selected transmission gear. The engine torque (not shown) may also be commanded so that engine speed follows or leads (e.g., moves earlier in time) the transmission input shaft speed output from the model or the observed transmission output shaft speed. During the upshift, the transmission input shaft speed is reduced because a higher ratio gear is pre-selected. The engine spark to engine torque adaptation request is also asserted at time T6 and the transmission input clutch state remains open. The engine spark begins to be retarded so that engine speed will follow transmission input shaft speed. The engine torque error is nearly zero.

Between time T6 and time T7, the engine spark to engine torque adaptation request remains asserted and engine spark is retarded to reduce engine torque so that engine speed follows the transmission input shaft speed. The conditions between time T6 and time T7 are dynamic spark control conditions since the transmission is shifting and engine speed and ISG speed is attempting to follow transmission input shaft speed via engine torque reduction. The ISG speed is adjusted to follow a transmission input shaft speed which may be output from the model. An engine torque error determined from ISG current develops and the engine torque error is a difference between engine torque provided by the engine and engine torque commanded to follow the transmission input shaft speed. The engine torque error is positive with a larger magnitude and then it is reduced. The actual engine torque is greater than the desired engine torque so the engine torque error is positive. The engine torque and spark that produced the engine torque are stored to controller memory. If the engine torque produced during the pre-selected gear shift is not within a threshold torque of the commanded engine torque, the engine spark timing may be adjusted. For example, if engine torque during the shift is commanded to be reduced by 100 N-m and the spark timing corresponding to the engine torque reduction is 8 degrees, but the actual engine torque is reduced by 75 N-m, then the spark timing in the engine spark timing to engine torque relationship may be revised to 9.5 degrees of spark retard to move the engine torque reduction toward the desired engine torque reduction.

At time T7, the request to adapt the engine spark to engine torque relationship is once again rescinded and engine spark timing is at base spark timing for the engine operating conditions. The engine torque error is zero and the transmission input clutch remains open. The transmission is engaged in pre-selected fourth gear. In this way, determining parameters for adapting the engine spark to torque relationship ends at time T7 and storing the parameters to controller memory also ceases. The values of the relationship between engine spark timing and engine torque may be adjusted responsive to engine spark and engine torque determined from time T6 to time T7.

In this way, values included in an engine spark to engine torque relationship may be adjusted during steady state idle conditions and during transient shifting between pre-selected transmission gears. The adaptation of values in the table or function that forms the engine spark to engine torque relationship may improve engine torque control by allowing engine torque to more closely follow demanded engine torque. As such, driveline torque disturbances during transmission shifting may be reduced.

Referring now to FIG. 5, a flowchart of a method for controlling a vehicle driveline is shown. The method of FIG. 5 may be incorporated into and may cooperate with the system of FIGS. 1A-3. Further, at least portions of the method of FIG. 5 may be incorporated as executable instructions stored in non-transitory memory while other portions of the method may be performed via a controller transforming operating states of devices and actuators in the physical world.

At 502, method 500 judges if engine torque reduction adaptation is requested. Engine torque reduction adaptation may be requested at predetermined vehicle distance travel intervals (e.g., every 3000 Km the vehicle is driven) or predetermined time intervals (e.g., every 100 hours the vehicle is driven). Further, engine torque reduction adaptation may be requested in response to driveline torque disturbance levels exceeding a threshold. If method 500 judges that there is a request to adapt engine torque reduction, the answer is yes and method 500 proceeds to 504. Otherwise, the answer is no and method 500 proceeds to 550.

At 550, method 500 reduces engine torque when requested via engine spark retard from MBT spark timing. For example, engine torque may be reduced during shifting of transmission gears, even when driver demand torque is not decreasing. Further, engine torque reduction may be performed in response to engine knock. The engine torque reduction may be performed according to an engine spark to engine torque relationship. The relationship may be stored in a table or function in controller memory (e.g., non-transient memory). Method 500 proceeds to exit after engine torque reduction is performed when requested.

At 504, method 500 judges if transmissions input clutches are open and if the electric machine is providing torque to propel the vehicle when requested by a human or autonomous driver. If so, the answer is yes and method 500 proceeds to 506. Otherwise, the answer is no and method 500 proceeds to 550.

At 506, method 500 shifts pre-select transmission gears responsive to vehicle speed and driver demand torque. The driver demand torque may be determined from an amount an accelerator pedal is applied by a human driver and vehicle speed. The transmission may shift pre-selected gears via unlocking a first gear that is locked to a transmission layshaft and locking a second gear to a layshaft. The transmission gears may be shifted from pre-selected gears via moving transmission shifting forks. In one example, the transmission gears are shifted from pre-selected gears to other pre-selected gears in response to a shift schedule and vehicle operating conditions. For example, the shift schedule may request or require a transmission gear shift from first gear to second gear at a vehicle speed of 20 Kph and engine load of 0.5. Since the transmission input clutches are not open, engine torque is not transmitted to vehicle wheels. Friction elements of the gear synchronizers equalize speed between layshafts and pre-selected gears so that the pre-selected gears may be locked to the splines of the lay shafts. The transmission input shaft then rotate at a multiple of transmission output shaft speed because the pre-selected gears enable torque transfer from the transmission output shaft to the transmission input shaft. Torque is not transmitted from a layshaft to an input shaft when gears are not locked to the layshaft. Method 500 proceeds to 508.

At 508, method 500 commands the ISG or BISG into a speed control mode and to follow input shaft speed of the transmission. The ISG or BISG may be commanded to follow output of a model that estimates transmission input shaft speed in response to vehicle speed and pre-selected gear. Alternatively, ISG or BISG speed may be commanded to follow speed of whichever transmission input shaft is coupled to a layshaft via a pre-selected gear that is locked to the layshaft. However, if transmission input shaft speed is less than a threshold speed, the ISG may be commanded to an engine idle speed. In speed control mode, torque of the ISG or BISG is adjusted so that ISG or BISG speed follows a desired speed. Therefore, if the ISG is commanded to operate at 2000 RPM and a positive load is applied to the ISG, ISG torque will increase to maintain the 2000 RPM so long as the ISG has torque capacity to meet the 2000 RPM. The desired speed may be constant or varying with time. Method 500 proceeds to 510.

At 510, method 500 operates the engine in a torque control mode. In torque control mode, engine speed may vary and engine torque follows a desired engine torque. Therefore, if the engine is outputting a constant torque at a constant engine speed and a positive load is applied to the engine, the engine will continue to output the same torque but engine speed will be reduced. By operating the engine in torque control mode and the ISG is speed control mode, it may be possible to adjust engine torque and maintain engine speed so that an assessment of engine torque output may be made. Method 500 proceeds to 512.

At 512, method 500 judges if the engine is at idle conditions. Engine idle conditions may be present when driver torque demand is less than a threshold and vehicle speed is less than a threshold. If method 500 judges that engine idle conditions are present, the answer is yes and method 500 proceeds to 530. Otherwise, the answer is no and method 500 proceeds to 514.

At 530, method 500 adjusts engine spark timing while maintaining engine speed at idle speed. In one example, the engine spark timing is continuously reduced in a ramp like fashion until a threshold amount of spark retard is applied to engine cylinders, then engine spark timing is advanced back to base spark timing for engine idle speed. The engine torque reduction caused by retarding engine spark may be compensated by increasing ISG or BISG current so that engine and ISG speed may be maintained at engine idle speed. Further, the ISG or BISG current increase may be a basis for estimating the engine torque decrease. For example, if ISG current was zero amperes immediately before spark timing is retarded at step 530 and it increased to 15 amperes at a particular engine spark retard timing, the ISG torque corresponding to 15 amperes may be determined to be the engine torque reduction corresponding to the particular engine spark retard timing. The ISG current may be converted into a torque via an ISG transfer function that describes ISG torque as a function of ISG current. For example, an ISG current of 15 amperes may correspond to 50 N-m. Method 500 retards engine spark timing and determines engine torque via ISG current each time engine spark is retarded. Method 500 proceeds to 532.

At 532, method 500 may adjust values of an engine spark to engine torque relationship. In one example, the engine spark to engine torque relationship may be in the form of a function or table as shown in FIG. 6. The relationship may output an engine torque value that corresponds to a particular engine speed, load, and spark timing. The relationship may apply for operating the engine with a stoichiometric air-fuel ratio. In one example, if an engine torque value determined at 530 is greater or less than an engine torque value in the engine spark to engine torque relationship corresponding to conditions under which the engine torque was determined, then the value in the engine spark to engine torque relationship may be increased or decreased so that actual engine torque may more closely match desired engine torque. For example, if the engine spark to engine torque relationship outputs a value of 100 N-m for engine load of 0.3, engine speed of 1200 RPM, and spark timing retarded 5 crankshaft degrees from MBT spark timing, but actual engine torque at the same conditions is 80 N-m, then the table value of 100 N-m may be changed to a value of 80 or a value between 80 and 100. Alternatively, the scaling of references or indexes into the relationship may be adjusted. For example, the spark timing value that is intended to provide the 100 N-m may be revised to a value of 7 crankshaft degrees, or some other spark value that increases engine output torque to approach 100 N-m.

In this way, values of a relationship that describes engine torque as a function of engine speed, engine load, and engine spark timing may be adjusted so that engine torque control may be improved. The values of the engine spark to engine torque relationship are stored to memory when the values are revised. Method 500 proceeds to 534.

At 534, method 500 operates the engine according to values in the engine spark to engine torque relationship. Thus, if a reduction or increase in engine torque is requested, engine spark timing is adjusted responsive to spark timing values in the engine spark to engine torque relationship to provide the requested engine torque. Method 500 proceeds to exit.

At 514, method 500 judges if the engine and vehicle are operating in dynamic conditions. Dynamic conditions may include but is not limited to when engine speed and torque are changing with time. One dynamic condition may be when a transmission is shifting pre-selected gears and engine speed is attempting to follow transmission input shaft speed to reduce driveline torque disturbances. Because the transmission input clutches are open, engine speed and torque output may be adjusted without vehicle occupants noticing a change in vehicle speed. Thus, the engine spark to engine torque adaptation may occur without being noticed by vehicle occupants. If method 500 judges that dynamic conditions are present, the answer is yes and method 500 proceeds to 516. Otherwise, the answer is no and method 500 returns to 502.

At 516, method 500 commands a reduction of engine torque. The engine torque reduction is accomplished via reducing spark advance. In one example, a desired engine torque reduction amount is used to index or reference an engine spark to engine torque relationship, a relationship that may be stored in a function, table, or structure in controller memory. The relationship outputs a spark timing value and engine spark timing is retarded from MBT spark timing by adjusting engine spark timing to the value output from the table or function. Method 500 proceeds to 518.

At 518, method 500 monitors ISG or BISG current to determine ISG or BISG torque when the engine spark timing is adjusted. Further, the ISG or BISG speed is adjusted to follow transmission input shaft speed via output of a model or measured transmission input shaft speed. If engine torque is reduced to reduce engine speed and engine speed follows the transmission input shaft speed, the ISG or BISG current is nearly zero. However, if the engine torque is not reduced sufficiently for engine speed to follow transmission input shaft speed, then ISG torque will change so that engine speed and ISG speed follow transmission input shaft speed. The ISG torque change may be observed as an ISG current change. Similarly, if the engine torque is reduced more than desired for engine speed to follow transmission input shaft speed, then ISG torque will change so that engine speed and ISG speed follow transmission input shaft speed. The ISG torque changes because the ISG is in speed control mode and because the ISG is following transmission input shaft speed. Method 500 proceeds to 520.

At 520, method 500 determines engine torque via the ISG current and values in the engine spark to engine torque relationship may be adjusted. The engine torque produced during the transient conditions is the engine torque commanded plus the torque of the ISG. The ISG torque changes only for the ISG to follow transmission input shaft speed. Therefore, if the engine torque reduction via spark timing provides a torque reduction that allows engine speed to follow transmission input shaft speed during shifting of pre-selected transmission gears, then ISG current and torque are zero. However, if the engine torque reduction via spark timing does not provide a torque reduction that allows engine speed to follow transmission input shaft speed during shifting of pre-selected transmission gears, then ISG torque is determined from ISG current and values in the engine spark timing to engine torque relationship may be adjusted responsive to the ISG current that provides the desired engine and ISG speed.

Method 500 may adjust values of an engine spark to engine torque relationship when ISG current indicates that engine torque control was insufficient for engine speed and ISG speed to follow transmission input shaft speed. In one example, the engine spark to engine torque relationship may be in the form of a function or table as shown in FIG. 6. The relationship may output an engine torque value that corresponds to a particular engine speed, load, and spark timing. The relationship may apply for operating the engine with a stoichiometric air-fuel ratio. In one example, if an ISG torque value determined at 520 is greater or less than a predetermined value, then the value in the engine spark to engine torque relationship may be increased or decreased so that actual engine torque may more closely match desired engine torque. Alternatively, the scaling of references or indexes into the relationship may be adjusted. For example, the spark timing value that is intended to provide the 100 N-m may be revised to a value of 7 crankshaft degrees, or some other spark value that increases engine output torque to approach 100 N-m. Method 500 proceeds to 534.

In this way, values in an engine spark to engine torque relationship may be adjusted responsive to dynamic and steady-state engine and vehicle operating conditions. The engine torque values may be adjusted as a function of spark timing or the engine spark timing may be adjusted responsive to engine torque.

Thus, the method of FIG. 5 provides for a driveline operating method, comprising: maintaining an engine at idle speed and operating the engine in a torque control mode while input clutches of a transmission are open in response to a request to adapt values of an engine spark to engine torque relationship, the engine positioned upstream of the input clutches; adjusting the values responsive to engine torque while maintaining the engine at idle speed; and operating the engine responsive to the values. The method further comprises: retarding spark timing from minimum spark for best torque spark timing in response to the request to adapt values of the engine spark to engine torque relationship; and operating an integrated starter/generator (ISG) in a speed control mode to maintain the engine at idle speed in response to the request to adapt values of the engine spark to engine torque relationship, the ISG operated at an engine idle speed. The method includes where the ISG is a belt driven ISG. The method includes where the ISG is a direct driven ISG. The method further comprises adjusting the values in further response to engine spark while maintaining engine idle speed. The method further comprises propelling the vehicle via a rear drive unit electric machine while input clutches of the transmission are open. The method includes where the transmission is a dual clutch transmission that includes two input clutches and gear synchronizers.

In some examples, the method of FIG. 5 provides for a driveline operating method, comprising: operating an integrated starter/generator (ISG) in a speed control mode and operating an engine in a torque control mode while input clutches of a transmission are open in response to a request to adapt an engine spark to engine torque relationship, the engine and the ISG positioned upstream of the input clutches; adjusting values of the engine spark to engine torque relationship; and operating the engine responsive to the adjusted values of the engine spark to torque relationship. The method further comprises pre-selecting gears of the transmission responsive to vehicle speed via locking and unlocking gears to one or more layshafts of the transmission. The method further comprises the ISG and the engine following speed of one or more transmission input shafts while pre-selecting gears of the transmission. The method further comprises adjusting the values of the engine spark to engine torque relationship responsive to ISG torque. The method includes where the ISG torque is estimated from ISG current. The method further comprises adjusting values of the engine spark to engine torque relationship responsive to a change in ISG speed due to pre-selecting a gear of the transmission. The method includes where the change in ISG speed is responsive to a ratio of the pre-selected gear.

Referring now to FIG. 6, a plot of an example engine spark to engine torque relationship is shown. The engine spark to engine torque relationship represents values stored in a table or function in controller memory. The values may be a basis for adjusting engine spark timing and/or engine torque.

The plot includes an axis labeled engine speed, an axis labeled engine load, and an axis labeled engine spark retard from MBT spark timing. Engine speed increases from the vertical axis in the direction of the arrow of the engine speed axis. Engine load increases from the horizontal axis in the direction of the arrow of the engine load axis. Engine spark retard is increased (e.g., additional spark retard) from the vertical axis in the direction of the arrow of the engine spark retard from MBT axis.

In this example, the engine spark to engine torque relationship 602 describes a unique engine torque value for each engine spark, engine load, and engine spark retard parameter combination. The engine torque values are represented via dots 604 and similar dots that form a surface plot. Values between the dots may be interpolated. The engine torque values or their corresponding engine load, engine speed, and engine spark retard scaling values that form the basis for indexing or referencing the relationship may be adjusted as described in method 500. By changing the values in the relationship, accurate engine torque control may be provided over the life of the vehicle.

In other examples, the engine spark to torque relationship may be described in a function, polynomial, or other known data format. Further, the surface shown is only exemplary and not meant to narrow or limit the scope of this disclosure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline operating method, comprising:
maintaining an engine at idle speed and operating the engine in a torque control mode while input clutches of a transmission are open in response to a request to adapt values of an engine spark to engine torque relationship, the engine positioned upstream of the input clutches;
adjusting the values responsive to engine torque while maintaining the engine at idle speed;
operating the engine responsive to the values; and
propelling a vehicle via a rear drive unit electric machine while the input clutches of the transmission are open.

2. The method of claim 1, further comprising:
retarding spark timing from minimum spark for best torque spark timing in response to the request to adapt values of the engine spark to engine torque relationship; and
operating an integrated starter/generator (ISG) in a speed control mode to maintain the engine at idle speed in response to the request to adapt values of the engine spark to engine torque relationship, the ISG operated at an engine idle speed.

3. The method of claim 2, where the ISG is a belt driven ISG.

4. The method of claim 2, where the ISG is a direct driven ISG.

5. The method of claim 1, further comprising adjusting the values in further response to engine spark while maintaining engine idle speed.

6. The method of claim 1, where the transmission is a dual clutch transmission that includes two input clutches and gear synchronizers.

7. A driveline operating method, comprising:
operating an integrated starter/generator (ISG) in a speed control mode and operating an engine in a torque control mode while input clutches of a transmission are open in response to a request to adapt an engine spark to engine torque relationship, the engine and the ISG positioned upstream of the input clutches;
adjusting values of the engine spark to engine torque relationship; and
operating the engine responsive to the adjusted values of the engine spark to torque relationship.

8. The method of claim 7, further comprising pre-selecting gears of the transmission responsive to vehicle speed via locking and unlocking gears to one or more layshafts of the transmission.

9. The method of claim 8, further comprising the ISG and the engine following speed of one or more transmission input shafts while pre-selecting gears of the transmission.

10. The method of claim 9, further comprising adjusting the values of the engine spark to engine torque relationship responsive to ISG torque.

11. The method of claim 10, where the ISG torque is estimated from ISG current.

12. The method of claim 7, further comprising adjusting the values of the engine spark to engine torque relationship responsive to a change in ISG speed due to pre-selecting a gear of the transmission.

13. The method of claim 12, where the change in ISG speed is responsive to a ratio of the pre-selected gear.

14. A system, comprising:
an engine;
an integrated starter/generator (ISG) coupled to the engine;
a dual clutch transmission including a first input clutch, a second input clutch, a first input shaft and a second input shaft, a first layshaft selectively coupled to the first input shaft, a second layshaft selectively coupled to the second input shaft, a plurality of gears, and an output shaft coupled to the first and second layshafts;
a rear drive unit including a rear axle and an electric machine coupled to the dual clutch transmission via a driveshaft; and
a controller including executable instructions stored in non-transitory memory to propel a vehicle via the rear drive unit while adjusting values of an engine spark to engine torque relationship, and instructions to operate the engine according to the adjusted values of the engine spark to engine torque relationship.

15. The system of claim 14, further comprising additional instructions to pre-select gears of the transmission while propelling the vehicle via the rear drive unit.

16. The system of claim 15, further comprising additional instructions to follow a speed of the first input shaft or the second input shaft via the ISG.

17. The system of claim 16, where pre-selecting gears of the transmission includes locking gears of the transmission to the first layshaft or the second layshaft.

18. The system of claim 14, further comprising propelling the vehicle via the rear drive unit with the first and second input clutches being open.

19. The system of claim 18, further comprising additional instructions to adjust the values of the engine spark to engine torque relationship responsive to engine torque values provided when the first and second input clutches are open.

* * * * *